United States Patent [19]

Lawson

[11] Patent Number: 4,476,397
[45] Date of Patent: Oct. 9, 1984

[54] ENERGY CONVERSION APPARATUS

[76] Inventor: David A. Lawson, Woodreed Farmhouse, Stonehurst La., Five Ashes, nr. Mayfield, East Sussex, England

[21] Appl. No.: 405,463

[22] Filed: Aug. 5, 1982

[30] Foreign Application Priority Data

Aug. 12, 1981 [GB] United Kingdom ................. 8124643

[51] Int. Cl.³ .................. F03D 5/06; F03B 13/12; B64C 31/06; B63G 8/42
[52] U.S. Cl. ....................................... 290/54; 290/42; 290/43; 290/53
[58] Field of Search ...................... 290/53, 54, 42, 43; 60/327, 719; 405/77, 78; 415/2; 416/85, 86, 87

[56] References Cited

U.S. PATENT DOCUMENTS

| | | | |
|---|---|---|---|
| 4,102,291 | 7/1978 | Sebald | 290/54 X |
| 4,124,182 | 11/1978 | Loeb | 290/42 X |
| 4,135,364 | 1/1979 | Busick | 290/54 X |
| 4,151,424 | 4/1979 | Bailey | 290/54 |
| 4,188,546 | 2/1980 | Kossler | 290/54 X |
| 4,224,527 | 9/1980 | Thompson | 290/54 |
| 4,258,271 | 3/1981 | Chapell et al. | 290/54 |
| 4,262,210 | 4/1981 | Yamine | 290/54 |
| 4,276,481 | 6/1981 | Parker | 290/54 X |
| 4,288,704 | 9/1981 | Bosard | 290/54 X |
| 4,295,783 | 10/1981 | Lebost | 290/54 X |
| 4,335,093 | 6/1982 | Salomon | 290/54 X |
| 4,348,594 | 9/1982 | Lipfert | 290/54 |
| 4,371,788 | 2/1983 | Smith, Jr. | 290/42 |

FOREIGN PATENT DOCUMENTS

| | | | |
|---|---|---|---|
| 2501795 | 9/1982 | France | 290/54 |
| 2503268 | 10/1982 | France | 290/54 |
| 184885 | 8/1922 | United Kingdom | |

Primary Examiner—John Gonzales
Assistant Examiner—Terry Flower
Attorney, Agent, or Firm—Sughrue, Mion, Zinn, Macpeak and Seas

[57] ABSTRACT

Apparatus for converting fluid energy into mechanical energy may include a sail and a mast carried by a pivotally mounted support.

The sail is mounted both directly to the mast and indirectly to the mast through a boom, which is pivotally mounted at its center or along its length about the mast, and which is also mounted for tilting movement about a fastening extending perpendicularly to the mast. Positioning means periodically causes the boom to yaw about the mast and to tilt. Opposite edges of the sail thus alternately become taut leading edges with respect to incident wind or water and the sail adopts an oscillating motion which powers mechanical drive means such as pumps. The positioning means may be an over-center spring return or, in an alternative embodiment, be a hydraulic control mechanism.

Advantages are that, because the sail remains full, it does not flap during repositioning even when formed of a light flexible material, which reduces inertial problems. Useful mechanical energy can be derived with a low level of technology from a large volume of incident fluid moving at a relatively low speed. The pressure from the pumps can be maintained at a constant value even if the speed of the incident fluid should alter.

27 Claims, 3 Drawing Figures

ENERGY CONVERSION APPARATUS

The present invention relates to apparatus for converting energy from one form into another form and is particularly concerned with the conversion of fluid energy into mechanical energy.

It is, of course, well known for flowing air to drive rotary vanes, as in wind pumps, and more recently it has become known for flowing water to drive rotary turbines, as in hydro-electric power stations.

In general, however, the trend of these known arrangements has been to rely on increasingly more advanced technology.

An aim of the present invention has been to provide apparatus which can rely on a low level of technology for both production and operation and which consequently is likely to be of particular benefit to developing countries and also to provide apparatus which can derive useful mechanical energy from a larger volume of fluid moving at a relatively slower speed than is normally possible with conventional rotary vanes or turbines.

Apparatus for converting fluid energy into mechanical energy, in accordance with the present invention, comprises fluid driven means operably connected to mechanical drive means under the control of positioning means which periodically acts to reposition the fluid driven means with respect to a flowing medium in such a manner that the fluid driven means is caused to adopt an oscillating motion which powers the mechanical drive means.

It will be appreciated that said apparatus is preferably for use in the oven environment and may be either wind powered (the flowing medium being air) or water powered (the flowing medium being for example a tide or a river) and may be mounted such that the incident direction of the wind or water is automatically maintained.

For the sake of convenience, terminology has been chosen which is normally associated with wind power rather than water power, but the use of such terminology must not be regarded as restricting the present invention to wind powered apparatus, and excluding water powered apparatus of functionally equivalent construction.

Preferably: the fluid driven means includes a sail carried by a pivotally mounted mast;
 the positioning means includes a device for resetting the sail whenever the mast has been pivoted through a predetermined angle to either side of a mean angular direction; and
 the mechanical drive means includes one or more reciprocating pumps and/or crank-driven rotary drives powered by the repeated pivoting of the mast.

Indeed, in an illustrative embodiment of apparatus in accordance with the present invention, the mast is connected at one end to a pivotally mounted support, the sail is mounted both directly to the mast and indirectly to the mast through a boom which is pivotally mounted at its centre or along its length about the mast, and the device for resetting the sail is an over-centre spring return which at one end is mounted to the support, and at its other end is slidably mounted to the boom along a track extending to either side of the mast.

In use, of said illustrative embodiment of apparatus in accordance with the present invention, the sail is set at an angle with respect to the incident flowing medium by the over-centre spring return, the sail is filled by the flowing medium causing the mast to roll in one sense, said other end of the over-centre spring return slides along the track on the boom until the mast has rolled through said predetermined angle, and the over-centre spring return then acts to cause the boom to yaw with respect to the mast, thereby resetting the sail with respect to the flowing medium so that the mast is caused to roll in the opposite sense, the entire sequence being repeated to set up the oscillating motion.

A significant advantage of this arrangement is that the sail remains full at all times, one edge of the sail being the leading edge on one stroke and the opposite edge after yawing of the boom being the leading edge on the next stroke. In this way all flogging or flapping of the sail which would occur in an arrangement where the flowing medium would alternately strike opposite faces of the sail is eliminated. Also, because the sail remains full it need not necessarily be formed of a light flexible material, although this reduces inertial problems, but could be formed of a rigid or semi-rigid material.

A further significant advantage of this arrangement is that, by providing appropriately adjustable lever linkages between the support and the reciprocating pump(s) and/or rotary drive(s), the pumping pressure or drive torque can be maintained even if the speed of the flowing medium should alter.

It will be appreciated that these significant advantages may be achieved by other embodiments. For example, the device for resetting the sail may utilise different control technology, and may be hydraulically operable. If intended to be water powered, the sail/boom combination may be replaced by a rigid sail-shaped body, and the mast may then be for example no more than a short mounting arm. Many other optional features for apparatus in accordance with the present invention are described hereinafter.

Reverting to the illustrative embodiment, to ensure that said other end of the over-centre spring return is not dragged with the track, but slides along the track as required, a retaining line may be provided.

The retaining line may extend between said other end of the over-centre spring return and a fixed position located on said mean angular direction. The length of the retaining line may be adjustable to determine the angle through which the mast is permitted to roll before the sail is reset which in turn determines the period of the oscillations. The retaining line may pass through a location point in a stand carried by a platform on which the apparatus is mounted. The retaining line may further be used to stop operation of the apparatus by being shortened to such an extent that the mast no longer has any freedom to roll.

Clearly, the mean angular direction about which the mast rolls is preferably the vertical.

In addition to being pivotally mounted for yawing movement about the mast, the boom may also be mounted for sliding movement along the mast, and tilting movement about an axis perpendicular to the mast. Resilient lines would then be provided tending to pull the boom away from the support in opposition to the over-centre spring return tending to pull the boom towards the support. With this arrangement, the over-centre spring return can act to tighten what is to be the leading edge of the sail whenever the sail is reset, one of the resilient lines acting to loosen what is to be the trailing edge of the sail. Because the sail stays full, even when being reset, only a small force is required to effect the resetting.

It may be possible to control the characteristics of the over-centre spring return by (a) adjusting its tension, (b) adjusting the location of its said one end on the support, and (c) adjusting the position of end stops for its said other end on the track, whereby an optimum combination of yawing, sliding and tilting movements on the boom with respect to the mast may be achieved.

To assist smooth operation, particularly when the sail is reset leading to the sense of rolling of the mast being reversed, resilient stays may be provided extending between the support and fixed positions, such as on the platform, the resilient stays acting to maintain the mast in an upright position whenever the sail is not filled by the flowing medium.

In one typical application, said apparatus is usable to pump water for irrigation purposes, said apparatus being mounted on a floating platform on the water so that, should the wind direction change, the floating platform can turn itself into the wind, the floating platform being stabilised to deter rocking consequent upon the oscillating motion of the fluid driven means when powering the mechanical drive means.

Apparatus according to the present invention will now be described, by way of example only, with reference to the accompanying drawings, in which.

Figure 1:
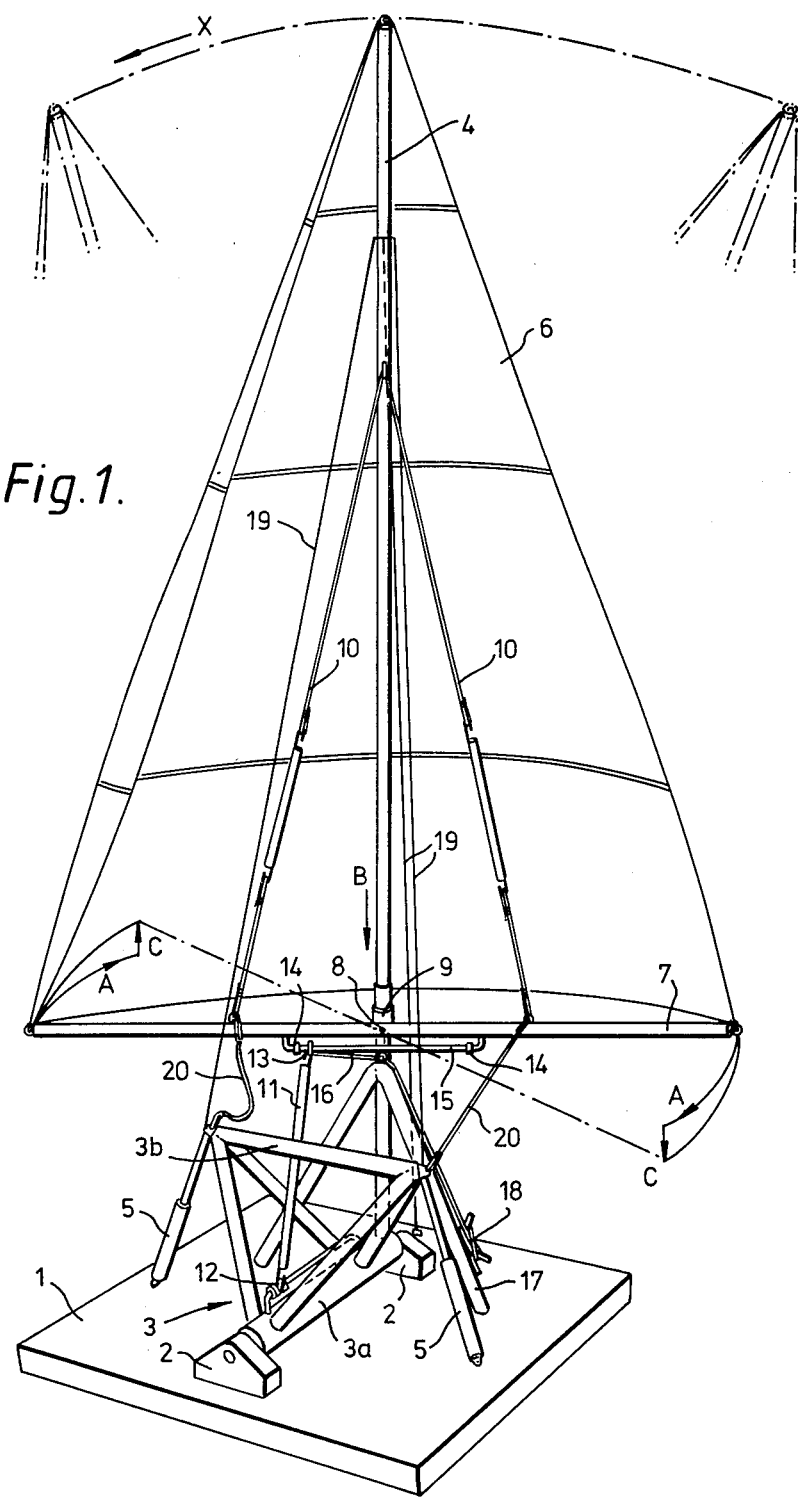
FIG. 1 is a perspective view of a first embodiment of said apparatus.

With reference initially to the first embodiment shown in FIG. 1, a platform 1 has a pair of brackets 2 for pivotally mounting a support 3. The support 3 is constituted by a rigid array of struts including in particular a shaft 3a and a beam 3b. The far end of the shaft 3a is rigidly secured to the lower end of a mast 4 (shown in an upright position) and the two ends of the beam 3b are pivotally secured to the piston-carrying moving parts of respective reciprocating pumps 5 (shown merely schematically in their mid-stroke positions). The positions of the connections between the pumps 5 and the beam 3b may be adjustable along the length of the beam 3b. As the mast 4 oscillates, i.e. rolls from side-to-side about the axis of the shaft 3a, the beam 3b also oscillates and powers the reciprocating pumps 5.

A single sail 6 is mounted directly to the upper end of the mast 4 and indirectly to an intermediate part of the mast 4 through a boom 7. The boom 7 can tilt about a fastening 8 between its ends which projects from a sleeve 9 in a direction perpendicular to the axis of the mast 4. The sleeve 9 is mounted about the mast 4 so that the boom 7 can yaw about the mast 4 and slide along the mast 4.

A pair of resilient lines 10 (in tension) tend to pull the boom 7 away from the support 3. An over-centre spring return 11 (in tension) tends to pull the boom 7 towards the support 3.

The lower end of the return 11 is rigidly secured to the shaft 3a—the position of the lower end of the return 11 along the length of the shaft 3a being adjustable by means of a bar and lock nut arrangement 12. The upper end of the return 11 is slidably secured to the boom 7—the upper end of the return 11 being formed with a ring 13 movable between end stops 14 on a track 15 carried by the boom 7 symmetrically to either side of the mast 4.

The ring 13 is also secured to one end of a retaining line 16 which passes through a locating hole at the apex of a stand 17 carried by the platform 1 with the other end of the retaining line 16 being secured to the stand 17 by means of a fixing 18.

Three stays 19 improve the rigidity of the mast 4 and a pair of stopping lines 20 prevent the boom 7 from yawing too far about the mast 4.

The apparatus is shown with the sail 6 full of air and causing the mast 4 to roll in the direction of the arrow X.

With continued rolling of the mast 4, one of the reciprocating pumps 5 (on the left) will shorten and the other of the reciprocating pumps 5 (on the right) will lengthen, with the track 15 sliding past the ring 13 whose position is fixed by the length of the retaining line 16.

When the ring 13 is level with the mast 4, the ring 13 is mid-way along the length of the track 15. The pull of the return 11 then starts to cause the boom 7 to yaw (in the direction of the arrows A), to slide (in the direction of the arrow B), and to tilt (in the direction of the arrows C). The ring 13 slides rapidly along the remaining length of the track 15 until it reaches the adjacent end stop 14. The other stopping line 20 (on the left) is now tight to prevent excess yawing of the boom 7 with the initially tight stopping line 20 (on the right) now being loose. The downward tilting of the boom causes what will become the leading edge of the sail 6 to tighten with a positive uplift to what will become the trailing edge of the sail 6 being provided by one of the resilient lines 10.

The sail 6 is thus reset with respect to the incident wind direction, which is here assumed to be constant, with the result that the mast 4 is now caused to roll in the reverse direction to that of the arrow X.

The entire sequence of operation is repeated, when the mast 4 has rolled through a corresponding angle to the other side of the vertical, whereby the mast 4 is caused to adopt an oscillating motion.

Figure 2:
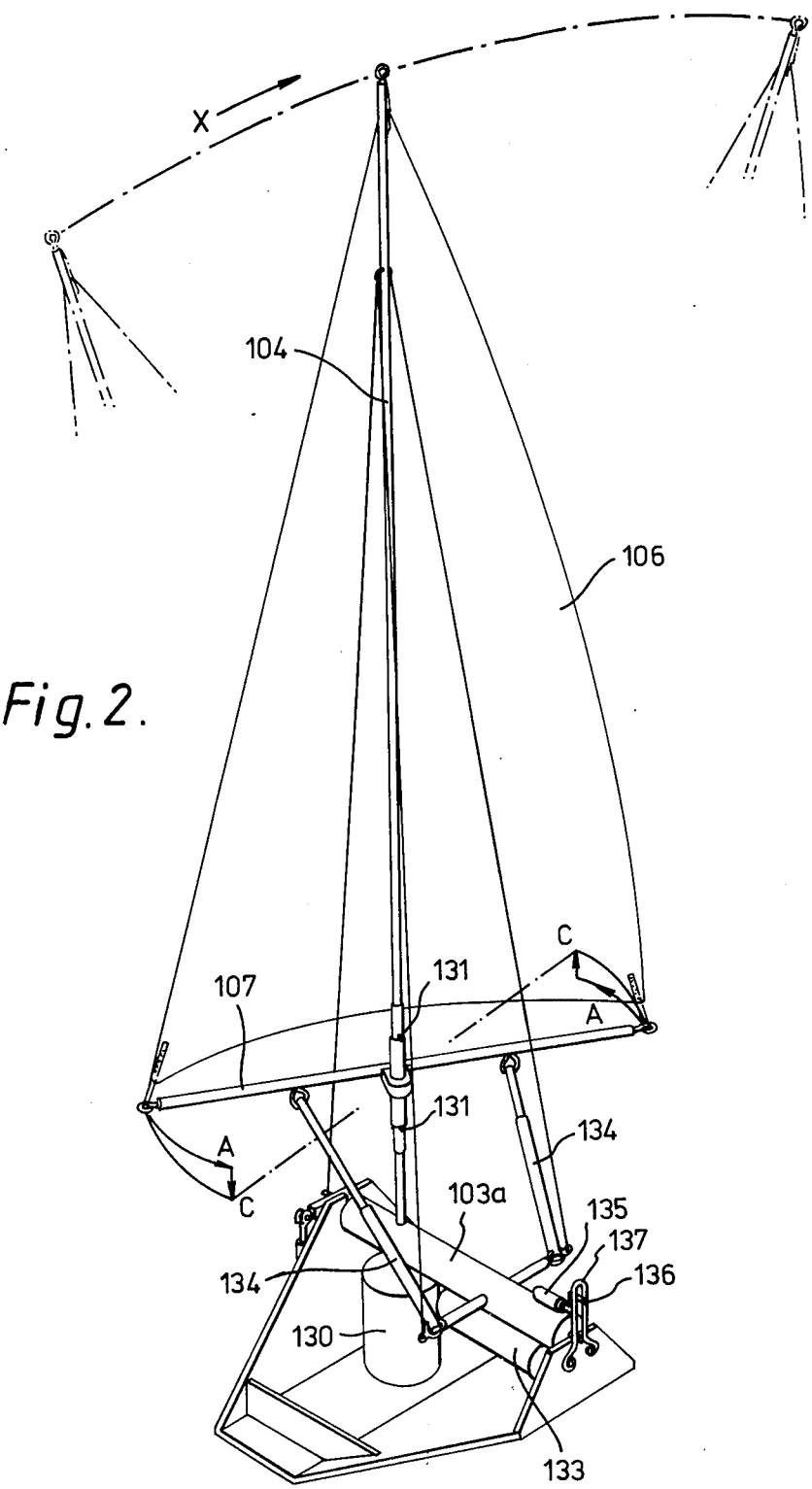
FIG. 2 is a perspective view from a different direction of FIG. 1 of a second embodiment of said apparatus.
Figure 3:
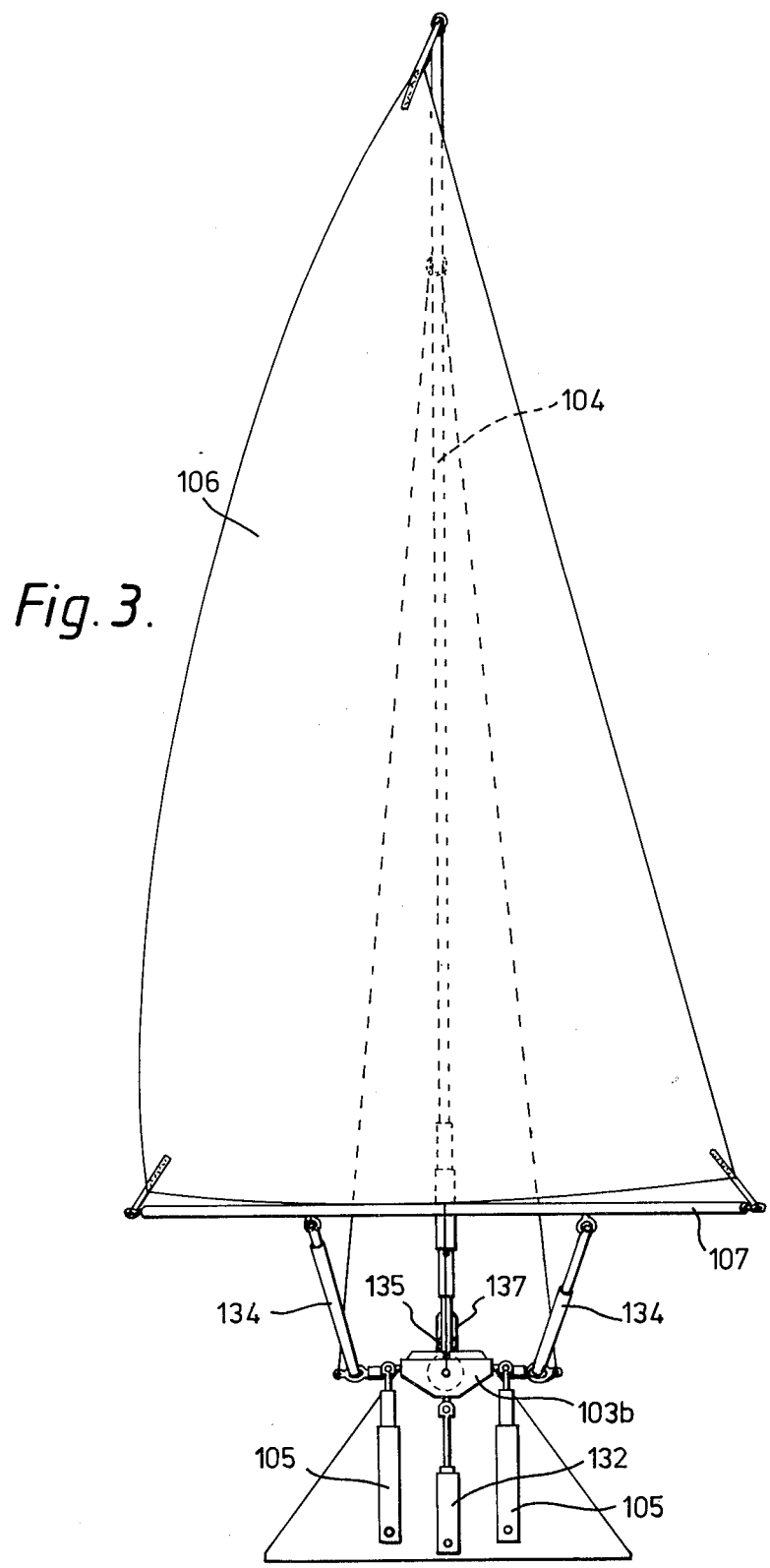
FIG. 3 is a rear elevation of the second embodiment shown in FIG. 2.

A second embodiment is shown in FIGS. 2 and 3. As its construction and manner of operation are very similar to the first embodiment shown in FIG. 1, similar reference numerals but increased by 100 will be used to refer to similar components. The following description will in fact concentrate on the different components presented by the second embodiment shown in FIGS. 2 and 3.

One difference is that mast 104 can be regarded as extending through shaft 103a and carrying at its lower end a counterweight 130 which tends to maintain the mast 104 in a vertical position.

Another difference is that boom 107 is mounted to the rear of the mast 104 and instead of being free to slide along the mast 104 is pre-set in a chosen position defined between stops 131. Altering the locations of the stops 131 allows the position of the boom 107 to be adjusted dependent upon different wind conditions. Another way of achieving a similar result would be to allow sail 106 to be adjustably secured to the upper end of the mast 104.

The main difference, however, is that the device for resetting the sail 106 is in the form of a hydraulic control mechanism, which for the sake of clarity has been indicated only schematically without all necessary connecting pipes.

A pivotally mounted reciprocating pump 132 has a piston-carrying moving part which is itself pivotally secured to beam 103b. As the mast 104 oscillates, the beam 103b not only powers pumps 105, but enables the pump 132 to deliver pulses of hydraulic fluid to a pressurised reservoir 133. Hydraulic fluid from the reservoir 133 is fed alternately to further appropriately mounted reciprocating pumps 134 by a cylindrical valve 135. The valve 135 is under the control of a link arm 136 which is cranked along its length and whose free end is mounted for movement within a vertical static reference channel 137.

As the mast 104 rolls in the direction of the arrow X, an inner part of the valve 135 secured to the link arm 136 is caused to rotate within an outer part of the valve 135. When the mast 104 reaches a predetermined angle to the vertical, fluid openings within the valve 135 are brought into line. Pressurised fluid is directed to one of the pumps 134 (on the left in FIG. 2) in a manner causing that pump 134 to shorten in length. The boom 107 is pulled, rather than pushed, and yaws (in the direction of the arrows A) at the same time as tilting (in the direction of the arrows C). While this is happening, hydraulic fluid in the other pump 134 is exhausted to the pump 132 for return to the reservoir 133. The sail 106 is thus reset with the new leading edge of the sail 106 being tightened.

Advantages of a hydraulic control mechanism, in comparison with the over-centre spring return of the first embodiment, are that it reduces frictional wear, it maintains a downward force on the leading edge of the sail for the full stroke, and it lends itself more readily to control by an electronic microprocessor, which could be programmed to adjust the angle of roll of the mast.

Other sizes, shapes and dispositions of one or more sails could be used to give differential leverage characteristics. Other arrangements could be used to tap the mechanical energy—for example the lower end of the mast could directly power a ratchet-like toothed wheel.

I claim:

1. Apparatus for converting fluid energy into mechanical energy, said apparatus comprising:
    fluid driven means including at least a concave front face, a convex rear face, a leading edge and a trailing edge,
    mechanical drive means,
    said fluid driven means being operatively connected to said mechanical drive means,
    means for pivoting said fluid driven means about a pivot axis located in front of the concave front face, and
    positioning means for controlling said fluid driven means which periodically acts to reposition the fluid driven means with respect to a flowing medium by pivoting the fluid driven means about said pivot axis such that the leading edge of the fluid driven means becomes a trailing edge with respect to the flowing medium and vice versa, thereby causing the fluid drive means to adopt an oscillating motion and powering the mechanical drive means.

2. Apparatus accoridng to claim 1, wherein said fluid driven means comprises a sail.

3. Apparatus according to claim 2, in which the sail is formed of a flexible material.

4. Apparatus according to claim 2, wherein a pivotally mounted mast carries said sail.

5. Apparatus according to claim 4, further comprising a boom and means for pivotally mounting said boom between its ends to said mast, and wherein said sail is secured to said boom.

6. Apparatus according to claim 5, in which the boom is pivotally mounted mid-way along its length about the mast.

7. Apparatus according to claim 5, wherein said means for mounting said boom to said mast comprises means for effecting sliding movement of said boom along said mast.

8. Apparatus according to claim 5, wherein said means for mounting said boom to said mast comprises means for adjustably securing said boom to said mast.

9. Apparatus according to claim 5, wherein said means for mounting said boom to said mast comprises means for effecting tilting movement of said boom about an axis perpendicular to the mast.

10. Apparatus according to claim 4, wherein a pivotally mounted support carries said mast.

11. Apparatus according to claim 4, in which the positioning means includes a device for resetting the sail whenever the mast has been pivoted through a predetermined angle to either side of a mean angular direction.

12. Apparatus according to claim 11, in which the device for resetting the sail is an over-centre spring return.

13. Apparatus according to claim 12, wherein said boom is pivotally mounted between its ends about the mast, the sail is secured to said boom, a pivotally mounted support carries said mast, the over-centre spring return is mounted at one end to said support, and at its other end is slidably mounted to the boom along a track extending to either side of the mast.

14. Apparatus according to claim 13, in which said other end of the over-centre spring return is secured to a retaining line.

15. Apparatus according to claim 14, in which the length of the retaining line is adjustable.

16. Apparatus according to claim 11, in which the device for resetting the sail is a hydraulic control mechanism.

17. Apparatus according to claim 16, in which the sail is secured to a boom which is pivotally mounted between its ends about the mast, the mast is itself carried by a pivotally mounted support, and the hydraulic control mechanism includes reciprocating pumps for manipulating the boom in dependence on the attitude of the support with respect to the mean angular direction.

18. Apparatus according to claim 17, wherein said reciprocating pumps are arranged to pull the boom.

19. Apparatus according to claim 17, in which a further reciprocating pump driven by the oscillating support supplies pressurised hydraulic fluid to a reservoir.

20. Apparatus according to claim 11, in which the mean angular direction is the vertical.

21. Apparatus according to claim 20, in which means are provided for maintaining the mast in a vertical position whenever the sail is not filled by the flowing medium.

22. Apparatus according to claim 21, in which said means is in the form of a counterweight carried by the mast.

23. Apparatus according to claim 1, in which the mechanical drive means includes at least one reciprocating pump powered by the repeated oscillating motion.

24. Apparatus according to claim 1, in which the position of the mechanical drive means is adjustable to maintain the driving force even if the speed of the flowing medium should alter.

25. Apparatus, for converting fluid energy into mechanical energy, comprising fluid driven means operably connected to mechanical drive means under the control of positioning means which periodically acts to reposition the fluid driven means with respect to a flowing medium in such a manner that the fluid driven means is caused to adopt an oscillating motion which powers the mechanical drive means, the fluid driven means includes a sail secured to a boom which is pivotally mounted between its ends about the mast, the boom is also mounted for tilting movement about an axis perpendicular to the mast, and the mast is itself carried by a pivotally mounted support, with the positioning means including a device for resetting the sail whenever the mast has been pivoted through a predetermined angle to either side of a mean angular direction.

26. Apparatus according to claim 25, in which the device for resetting the sail is an over-centre spring return which is mounted at one end to the support, and at its other end is slidably mounted to the boom along a track extending to either side of the mast.

27. Apparatus according to claim 25, in which the device for resetting the sail is a hydraulic control mechanism which includes reciprocating pumps for manipulating the boom in dependence on the attitude of the support with respect to the mean angular direction by pulling rather than pushing the boom.

* * * * *